H. J. HANSEN.
SELF OILING BEARING.
APPLICATION FILED JAN. 23, 1917.

1,271,570.

Patented July 9, 1918.

Hjalmar J. Hansen, Inventor

By his Attorneys

Edwards, Sager & Richmond

UNITED STATES PATENT OFFICE.

HJALMAR JOHAN HANSEN, OF ERIE, PENNSYLVANIA, ASSIGNOR TO BURKE ELECTRIC COMPANY, A CORPORATION OF PENNSYLVANIA.

SELF-OILING BEARING.

1,271,570.

Specification of Letters Patent.     Patented July 9, 1918.

Application filed January 23, 1917. Serial No. 143,933.

*To all whom it may concern:*

Be it known that I, HJALMAR J. HANSEN, a citizen of the United States, residing at Erie, in the county of Erie and State of Pennsylvania, have invented certain new and useful Improvements in Self-Oiling Bearings, of which the following is a specification.

My invention relates to self-oiling bearings and is particularly well adapted for use in dynamo electric machines, but also advantageously applicable to bearings of other devices.

The object of my invention is to provide a self-oiling bearing which will supply a plentiful continuous flow of oil from the oil reservoir to the bearing and to accomplish this in a reliable manner by a simple and economical form of construction.

In order to secure efficiency of the oiling means, it is essential that the carrier of the oil from the reservoir to the bearing shall be capable of continuously supplying a comparatively large flow of oil to the upper portion of the bearing shaft and thereby be distributed over the entire bearing. I have discovered by experiment that a carrier for the oil in the form of a stiff ring made of felt, wool or other fabrics is particularly well adapted for carrying the oil to the shaft in a plentiful and uniform supply, as well as serving to fulfil the other objects of my invention. In fulfilling its function, fabrics of many forms have the property of absorbing oil within the body of the fabric and of also carrying a comparatively large quantity of oil over the surfaces of the fabric to the upper portion of the rotating shaft, and also the property of parting with this oil in quite large proportions from the ring when passing over the rotating shaft. I have also found that the frictional engagement between a fabric of this character and the rotating shaft is sufficient to insure a uniform rotation of the ring fabric with sufficient speed to insure its proper function continuously.

My invention will be understood from the following description and accompanying drawings, in which—

Figure 1:
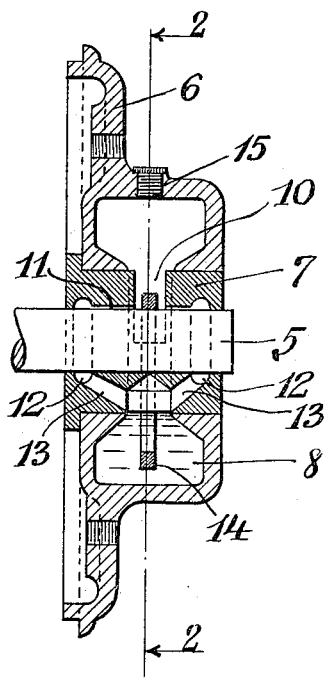
Figure 2:
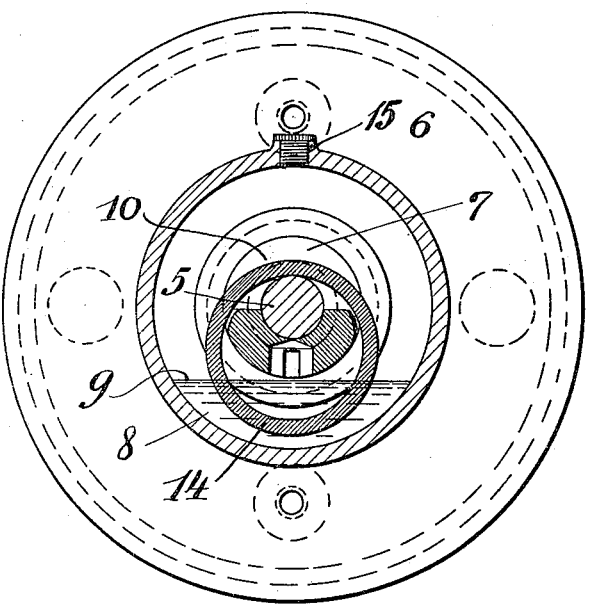

Figure 1 is a vertical cross section of one form of bearing embodying my invention, and Fig. 2 is a vertical cross section on the line 2—2 of Fig. 1.

The driving or driven shaft is indicated by the reference character 5, which may be the shaft of a dynamo or motor or other machine. A bracket or end plate 6 carries and supports the bearing for the shaft, the bracket 6 in this instance being shown of circular form adapted to fit upon and be supported by the frame of the machine. The bracket has a central opening in which is located the bearing sleeve 7 of suitable bearing material. The bearing bracket has a chamber 8, the lower portion of which serves as a reservoir for the oil, the normal level of the oil being indicated by the line 9. An opening 15 with a removable cover is formed at the top of the oil chamber for inspection and access to the oil chamber. The upper portion of the bearing sleeve is slotted as shown at 10 and is also provided with channels 11 at the top portion of the shaft and which open into the slot 10 of the bearing. The bearing is also shown provided with circumferential grooves 12 which in turn are connected by channels 13 in the lower portion of the bearing sleeve, which serve as return paths for the oil to the lower portion of the oil reservoir.

The ring 14 encircles the shaft 5 and is in frictional engagement with the top portion thereof, but is of larger diameter than the shaft so that the lower portion of the ring passes through the oil in the oil reservoir, as shown. The upper portion of the ring passes through the slot 10 in the upper part of the bearing sleeve. The oil ring as already stated is of felt, wool or other fabric of sufficient stiffness to retain its shape and form in service. The ring is made of stiff material of that character and preferably of stiff felt, because such material has the property not only of serving as an excellent oil carrier, but also has sufficient compactness and rigidity to retain its general form and to continue in service for long periods without material wear. The felt ring may be conveniently made by first forming a cylinder of felt of the same diameter as the ring and then cutting the cylinder or tube of felt into sections each the desired width of the oil ring. The felt ring may also be formed by stamping the same out of a sheet of felt of the desired thickness. In operation the shaft drives the ring by frictional engagement. By reason of its properties of carrying and delivering the oil, the same serves as an efficient, simple and economical oiling means. The form of construction of the bearing assists in securing good circulation of the oil through the bearing and also tends to prevent any oil from passing out through the ends of the bearing.

Another important feature of my invention is the fact that even though the ring should, from any cause, fail to rotate or creep with the shaft, yet it will even then serve to oil the bearing to better advantage than when the usual stationary oil wick is used. With my invention even though the fabric ring becomes stationary while the shaft is rotating, the oil will continue to be fed up through the fabric ring by capillary attraction and will have two paths for such feeding of the oil, one on each side of the shaft. Also there being no force exerted compressing the fabric there is greater freedom for the oil to pass freely through the same by capillary attraction. Thus even with my improved ring stationary, it is more satisfactory than the usual stationary oil wick which is forced by a spring against the bottom of the shaft, which pressure gradually deteriorates its oiling function by making the wick too compact.

Another advantage of my invention is that it does not wear or abrade the surface of the shaft.

Although I have referred to the use of felt, wool and other fabrics for the oil ring, yet in some instances, the ring may be made of other non-metallic materials which might serve the purpose satisfactorily.

My invention may be embodied in various modified forms of construction, without departing from the scope thereof.

I claim:—

1. In a self oiling bearing, the combination of a shaft and bearing therefor, a reservoir for the oil, and a ring formed solely of stiff non-metallic material encircling said shaft and adapted to have its lower portion pass through the oil in said reservoir.

2. In a self oiling bearing, the combination of a shaft and bearing therefor, a reservoir for the oil, and a ring formed solely of stiff non-metallic material encircling said shaft and frictionally driven by said shaft and adapted to have its lower portion pass through the oil in said reservoir.

3. In a self oiling bearing, the combination of a shaft and bearing therefor, a reservoir for the oil, and a ring formed solely of stiff fabric encircling said shaft and adapted to have its lower portion pass through the oil in said reservoir.

4. In a self oiling bearing, the combination of a shaft and bearing therefor, a reservoir for the oil, and a ring formed solely of stiff fabric encircling said shaft and frictionally driven by said shaft and adapted to have its lower portion pass through the oil in said reservoir.

5. In a self oiling bearing, the combination of a shaft and bearing therefor, a reservoir for the oil, and a ring formed solely of stiff felt encircling said shaft and adapted to have its lower portion pass through the oil in said reservoir.

6. In a self oiling bearing, the combination of a shaft and bearing therefor, a reservoir for the oil, and a ring formed solely of stiff felt encircling said shaft and frictionally driven by said shaft and adapted to have its lower portion pass through the oil in said reservoir.

HJALMAR JOHAN HANSEN.